United States Patent [19]

Ugelstad

[11] 4,113,687

[45] Sep. 12, 1978

[54] PROCESS FOR PREPARING LATEX

[75] Inventor: John Ugelstad, Trondheim, Norway

[73] Assignee: Sintef, Norway

[21] Appl. No.: 825,136

[22] Filed: Aug. 16, 1977

[30] Foreign Application Priority Data

Aug. 10, 1977 [NO] Norway .................................. 772805

[51] Int. Cl.$^2$ ................................................ C08F 2/24
[52] U.S. Cl. ...................... 260/29.6 XA; 260/23 XA; 260/29.6 RB; 260/29.6 MQ; 260/29.6 R; 260/29.7 R; 260/29.7 NQ
[58] Field of Search ..... 260/23 XA, 29.6 R, 29.6 RB, 260/29.6 MQ, 29.6 XA, 29.7 R, 29.7 NQ

[56] References Cited

U.S. PATENT DOCUMENTS 2,575,553  11/1951  Kolyoort ........................ 260/29.6 R

*Primary Examiner*—V. P. Hoke
*Attorney, Agent, or Firm*—Wenderoth, Lind & Ponack

[57] ABSTRACT

A process for preparing a latex by efficiently homogenizing an aqueous mixture containing an emulsifier and a water-insoluble solvent for the monomer(s) to be polymerized, adding monomer and if desired further water to the homogenized mixture and also a water-soluble polymerization initiator. Instead of a water-soluble polymerization initiator an oil-soluble polymerization may be used having sufficient solubility to diffuse through the aqueous phase into the drops of water-insoluble solvent and monomer.

21 Claims, No Drawings

PROCESS FOR PREPARING LATEX

This invention relates to a process for preparing latex by emulsion polymerisation.

In an ordinary process for preparing latex by emulsion polymerisation water, monomer, emulsifier and a water-soluble initiator are mixed by means of ordinary stirring equipment. The drops of monomer are present in the form of micelles having a size of about 10 μm. The emulsifier is present in the form of micelles swelled with monomer. Only a very small part of the emulsifier is adsorbed to the surface of the drops of monomer, since the total surface of the drops is very small due to their relative large size. The polymerisation starts by radicals formed from the water-soluble initiator diffusing into the micelles, the total surface of which is much larger than that of the monomer drops. By reaction of radicals with monomer in the micelles a polymer is formed, and the micelles are converted to polymer particles swelled with monomer. In certain cases in which the monomer is somewhat water-soluble, radicals formed in the aqueous phase will react with the monomer therein, and polymer particles will also be formed directly in the aqueous phase by precipitation of polymer molecules when they have reached a sufficient chain-length. The particle formation itself is usually over already after a degree of reaction of about 2 percent. In the system there will then be present polymer particles swelled with monomer + monomer drops. The further polymerisation takes place in the polymer particles by radicals from the aqueous phase being absorbed in it and reacting with monomer therein. The monomer drops only serve as a reservoir for monomer which diffuses from these through the aqueous phase, initially into the micelles, later into the polymer particles, and maintains a constant concentration of monomer therein as monomer is consumed during the polymerisation.

The important feature in ordinary emulsion polymerisation is accordingly that the particle formation takes place in the aqueous phase, either by absorption of radicals in the micelles, or by precipitation of polymer formed from the radicals from the initiator and monomer dissolved in the aqueous phase. No article formation of polymerisation takes place in the monomer drops.

In order to maintain a high stability of the latex formed in the polymerisation, a relatively high concentration of emulsifier must be used. This has the effect that in ordinary processes a very large number of micelles are formed, and thereby also a large number of small particles, and it is not easy to control the particle size without using specific methods of operation which include stepwise addition of emulsifier or seed-polymerisation.

Another process for preparing latex is the socalled dispersion polymerisation. In this process monomer, water, emulsifier and an oil-soluble initiator are dispersed by means of an efficient homogenisator so that the monomer exists as fine drops. The size of the drops are determined by the efficiency of the homogenisation. By using an oil-soluble initiator the polymerisation will to a great extent take place in the monomer drops formed by the homogenisation, and the final latex particles will have a size corresponding to the original size of the drops. This method, which is well known from the literature, for instance from Norwegian Pat. No. 112,092, requires a very time-consuming and expensive homogenisation process.

Indeed the process can be somewhat simplified by not subjecting the entire polymerisation mixture to homogenisation, for instance as described in West German "Auslegeschrift" 2,501,630, but this is also not quite satisfactory.

Another difficulty is that formation of deposits and lumps, "build-up", frequently occurs during the polymerisation, which may be due to the presence or the formation of larger drops during the polymerisation, and also that some coagulation of latex occurs.

It has now surprisingly been found that by means of a process which comprises homogenisation, there may be employed a water-soluble initiator, in which process the disadvantages of the known processes are avoided while the advantages are maintained. It was to be expected that by using a water-soluble initiator the particle formation would take place in the aqueous phase, which is usual in the emulsion polymerisation with water-soluble initiators, and that the advantages which are connected with initiation in the monomer drops and which can be attaind by dispersion polymerisation with oil-soluble initiator, could therefore not be attained.

According to the invention there is provided a process for preparing a latex which comprises efficiently homogenising an aqueous mixture containing an emulsifier and a water-insoluble solvent for the monomer(s) to be polymerised, whereafter monomer or a mixture of monomers to be polymerised, a water-soluble polymerisation initiator, and if desired further water, are added to the homogenised mixture.

Initially, therefore one homogenises water + emulsifier + a water-insoluble, monomer-dissolving substance (in the following for the sake of convenience also called "Substance I"), whereby a very stable preemulsion is formed.

To the emulsion formed by the homogenisation the rest of the water + monomer or monomer mixture + the water-soluble initiator is now added with ordinary stirring. The polymerisation is performed as usual at elevated temperature, 50°–70° C. Examinations of the system after different stages have shown that in the emulsion formed after the homogenisation very small drops are present, but since the amount of Substance I is very small the majority of the emulsifier will still be found in the aqueous phase. When the monomer is added to the homogenised mixture, the monomer will diffuse into the drops formed during the homogenisation, and a stable emulsion of the monomer is formed. Due to the fact that monomer diffuses into the drops formed in the homogenisation and results in a swelling thereof, the total surface of the drops will increase, and the majority of the emulsifier will be adsorbed onto the drops. It is an essential feature of the invention that in this way there is provided such a finely divided and stable emulsion of monomer that the majority of the emulsifier is adsorbed on the monomer-swelled drops. The large surface of the monomer-swelled drops together with the fact that in this manner only a small part of the emulsifier remains in the aqueous phase, ensures that the radicals, although being formed by the water-soluble initiator in the aqueous phase, will be captured so effectively by the monomer-swelled drops that the polymerisation primarily takes place in the drops, and little or no particle formation in the aqueous phase is obtained.

During the homogenisation it is possible, if desired, to use only some of the water necessary, the rest of the water being added together with the monomer and the water-soluble initiator after homogenisation.

The requirement of Substance I which is homogenised, is that it should have a water-solubility at 25° C. $< 10^{-3}$ g/l $H_2O$. Examples of such substances are alkanes, linear and branched, which may be partly halogenated, and which contain at least 10 carbon atoms.

A feature of particular interest is that as Substance I there may be employed substances which have a desired function in the final polymer. Advantageously for instance phosphates, sebacates, adipates and phthalates containing such organic groups that they have the desired water-insolubility may be used as Substance I. Said three types of compounds will act as plasticisers when the main monomer is vinyl chloride. As Substance I it is also possible to use an epoxy compound e.g. epoxidised soyabean oil, which acts as stabiliser when the monomer is vinyl chloride. Further, as Substance I there may generally be used water-insoluble monomers, especially vinyl compounds, which during the subsequent polymerisation will co-polymerise with the main monomer. Examples of such monomers are acrylates, $CH_2=CHCOOR$, methacrylates,

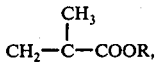

vinyl ethers, $CH_2=CHOR$, vinyl esters, $CH_2=CHOOCR$ and substituted vinyl benzenes

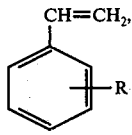

wherein R in every case is an organic group conferring the desired water-insolubility. In the substituted vinyl benzenes R may have at least 6 carbon atoms, and in the other aforementioned monomers R may have at least 15 carbon atoms.

It is a condition that Substance I is a solvent for the monomer and under the conditions given, i.e. in the emulsion, is capable of dissolving the monomer(s) in a ratio >100:1, i.e. 1 part by weight of Substance I must be capable of dissolving at least 100 parts by weight of monomer. A condition for this is that the molecular weight of Substance I is not too high, accordingly it is for instance not possible to use a polymer. Preferably, the ratio between the molecular weight of Substance I and the molecular weight of the monomer should not exceed 20.

By means of the present invention process there are obtained several advantages in comparison with the previously known processes comprising initiation in drops, all being dispersion processes with oil-soluble initiators being present during the homogenisation.

Since, in the present process initiator is not present during the homogenisation, this may be performed at any temperature, even in the presence of monomers or comonomers, which facilitates the homogenisation. The formed homogenised emulsion containing the water-insoluble component is stable for several weeks at room temperature. As the initiator is not present there is no risk of decomposition of the initiator, and if monomer is present, there is no risk of polymerisation in the preemulsion.

A certain modification of the process may be made in some cases when it is desired to use as little as possible of Substance I. This will particularly be the case when Substance I does not have any function or may be undesired in the final polymer, as the case will usually be with alkanes. Also when substances such as said plasticisers and comonomers are used it will often be of interest to use relatively little of these for economical reasons.

Although it is absolutely necessary for the process that some Substance I is present during the homogenisation, it has been found that a substantial part thereof may be replaced by another substance (in the following also called "Substance II") which is not a subject of the same requirements with respect to water-insolubility, but which has a water-solubility in the same order as the monomer to be polymerised. With vinyl chloride this component may for instance be an ordinary plasticiser such as dibutyl or dioctyl phthalate or tricresylphosphate. It may also be some of the main monomer or one of the main monomers or another monomer which in the subsequent polymerisation upon addition of the main monomer copolymerises therewith. As an example it may be mentioned that with vinyl chloride as main monomer there may be added in addition to Substance I during the homogenisation vinyl esters such as vinyl acetate or propionate, acrylates or methacrylates e.g. methyl methacrylate or butyl acrylate, or styrene, as Substance II. With styrene as main monomer it is possible, in addition to Substance I, to add butyl acrylate as Substance II in the homogenisation.

When a styrene-butadiene copolymer is prepared, some styrene may be added in addition to Substance I.

It is an essential feature of the invention that there is not present any solvent which evaporates during the drying process, and this is ensured through a sufficiently high boiling point of the added substances or through their copolymerisation with the monomer.

In the homogenisation it is the homogenisation pressure which determines *the size* of the drops in the homogenised emulsion, while by varying the amount of substances (Substance I + optionally Substance II) being homogenised, it is possible to vary *the number* of drops in the emulsion at a given homogenisation pressure. Upon addition of monomer to the homogenised emulsion the monomer will be distributed approximately equally between the drops (if these have the same size), and the size of the monomer-swelled drops and thereby of the final latex particles will be proportional to the amount of monomer and inversely proportional to the amount of the homogenised substances at a given homogenisation pressure. Increased pressure of homogenisation will result in smaller but more drops in the homogenised emulsion (and in the final latex).

If Substance I is used in a very small amount only, this may result in that a too small number of drops are formed during the homogenisation. Again, this will have the effect that after the monomer has been stirred in, the drops will get too big since large amounts of monomer have diffused into each drop, which may lead to undesirably large size of the latex particles. Similarly, the fact that a small number of large drops are present after monomer has diffused in, may lead to insufficient adsorption of approximately all emulsifier onto the drops, and this will result in the formation of particles in the aqueous phase and an undesirably high number of very small particles.

By addition of more of Substance I in addition to said small amount of Substance I during the homogenisation, the number of drops are increased at a given homogenisation pressure. Upon addition of monomer there will in this case be present a larger number of drops, which ensures a more effective adsorption of emulsifier on the drops, and thereby the formation of particles in the aqueous phase is prevented. It will also be clear that at a given homogenisation pressure and with a given amount of Substance I the size of the particles in the final latex may be varied by varying the amount of the more water-soluble Substance II during the homogenisation.

Substance I together with Substance II will during the homogenisation form drops having the same size as with Substance I alone, but in a larger number. There will then be available more drops for the monomer to diffuse into, and the particle size of the final latex will be smaller than when the given amount of Substance I is used alone during the homogenisation.

The process according to the application may be carried out with very small amounts of the water-insoluble Substance I, for instance 5–10 g of Substance I per 1000 g of water. This also has the effect that the homogenisation may be carried out with much less water, for instance 25 ml per 5 g of Substance I. If it is desired to use Substance I in as small amounts as possible, some of it may as mentioned be replaced by a partly water-soluble Substance II, if it for instance is desired to homogenise 10 g in the first stop to attain a desired particle size, one may use 1 g of Substance I and 9 g of Substance II.

In the final emulsion, after the addition of more water and monomer, there will normally be 1000 g of water and 600 to 1000 g of monomer. During the homogenisation before addition of more water and monomer, there is normally employed an amount of Substance I of from 1 to 30 g. Substance II is optionally employed in an amount of 5 to 200 g. Water is normally used in amounts of from 25 to 500 ml during the homogenisation. The amount of emulsifier depends on the type of emulsifier depends on the type of emulsifier used, and when using Na-lauryl sulphate 2 to 20 g are normally used.

The above weight proportions translated into weight ratios is such that the weight ratio of emulsifier and solvent to total water is 1:500–1:50 and 1:1000–3:100, respectively, and the weight ratio of emulsifier and solvent to monomer(s) is 1:500–1:30 and 1:1000–1:20, respectively.

As described above the rest of the water, monomer and water-soluble initiator, such as $K_2S_2O_8$, are added to the homogenised emulsion, and the polymerisation takes place in ordinary manner. It is of course possible to prepare larger amounts of the homogenised preemulsion, than that which is to be used immediately, and the remaining amount of the preemulsion may be stored and used by later addition of monomer, water and initiator. It is also possible to add water and monomer by ordinary stirring to the homogenised preemulsion, whereby the monomer diffuses into the drops to give a stable emulsion which even at 50° C. remains unchanged for several days. The water-soluble initiator may then be added, and the polymerisation takes place.

According to a further embodiment of the present invention I have found that an oil-soluble initiator may be used in stead of a water-soluble initiator, provided the former possesses a certain water-solubility. According to the process the oil-soluble initiator is added in a manner corresponding to that of the water-soluble initiator mentioned above, that is together with monomer or after the monomer has diffused into the preformed drops. Since it is a proviso that the initiator used according to the invention possesses a certain water-solubility, similar to the monomer it will diffuse through the aqueous phase into the drops and initiate the polymerisation therein. An example of an initiator having sufficient water-solubility for diffusing through the aqueous phase to the drops, is azo-iso butyric acid nitrile, AIBN. An example of an initiator which may not be used is lauroyl peroxide the solubility of which in water being too low for diffusing through the aqueous phase. Also with partially water-soluble initiators such as, e.g., AIBN one retains the great advantage of the process disclosed above, viz., that the initiator can be added after the homogenisation.

This embodiment requires that during the polymerisation all of the monomer has been absorbed in the preformed drops; however, this has turned out not to be any problem when using a sufficient amount of the water-insoluble solvent and a sufficiently effective homogenisation.

The following examples serve to illustrate the invention.

Examples 1–6 illustrate the use of different types of Substance I, whilst examples 7–10 illustrate cases in which some of Substance I has been replaced by Substance II. The comparative examples A–C illustrate the preparation of latex by ordinary emulsion polymerisation. Examples 11 and 12 illustrate the use of oil-soluble initiators.

EXAMPLE 1a 10 g of hexadecane + 200 ml of $H_2O$ + 4 g of Na lauryl sulphate were mixed by ordinary stirring and homogenised by using a 2 stage Laboratory Homogenizer Model 15 M Gaulin Corporation, USA for about 2.5 min. (operating pressure 1st stage: 150 kg/cm$^2$, operating pressure 2nd stage: 50 kg/cm$^2$). After the homogenisation 800 ml of $H_2O$ + 800 g of vinyl chloride were added, and stirring was carried out for 30 min. at 50° C. Then, 1.6 g of $K_2S_2O_8$ were added, and polymerisation was carried out at 50° C. The latex formed contained particles in the range 0.3–0.8 μm. The formation of deposits was negligible.

EXAMPLE 1b

Homogenisation of 10 g of hexadecane, 200 ml of $H_2O$ and 4 g of Na Lauryl sulphate was carried out as described in example 1a. The formed preemulsion was stored for 1 week at room temperature (about 25° C.) and was then subjected to further treatment as described in example 1a, with the same result.

EXAMPLE 1c

The preparation of the preemulsion was carried out as in example 1a, 800 ml of $H_2O$ + 800 g vinyl chloride were added as described in example 1a. The emulsion formed was stored for 24 hours at room temperature, whereafter 1.6 g of $K_2S_2O_8$ were added, and polymerisation was carried out as in example 1a with the same result.

EXAMPLE 2

In order to illustrate the possibilities for varying the particle size in the final latex, experiments were carried out with less hexadecane than that which was used in example 1.

5 g hexadecane + 100 ml of $H_2O$ + 4 g of Na laurylsulphate were homogenised as described above. After homogenisation 900 ml of $H_2O$ + 800 g of vinyl chloride + 1.6 g of $K_2S_2O_8$ were added. After polymerisation the latex contained particles in the range 0.4 to 1 μm. Less hexadecane results in a latex having larger particles, since each of the drops formed during the homogenisation were swelled with more monomer. Formation of deposits and stability as in example 1.

EXAMPLE 3

As water-insoluble substance it is possible to use one which is a comonomer for vinyl chloride. There was used a vinyl ether having such a long chain that sufficient water-insolubility is attained to satisfy the requirements for Substance I.

20 g of an ether of the formula $CH_2=CHO(CH_2)_{21}CH_3$ were added to 300 ml of $H_2O$ + 4 g of Na lauryl sulphate and homogenised as above. To this preemulsion 700 ml of $H_2O$ + 800 g of vinyl chloride + 1.6 g of $K_2S_2O_8$ were added, and polymerisation was carried out at 50° C. The resulting latex contained particles in the range 0.26–0.6 μm.

In this example the amount of the water-insoluble substance has been increased in comparison with the amount used in example 1. This results in a latex having smaller particles, since each of the drops formed during the homogenisation were swelled with less monomer. Formation of deposits and stability as in example 1.

EXAMPLE 4

As water-insoluble comonomer it is also possible to employ a long-chain vinyl ester.

20 g of an ester $CH_2=CHOOCR$ in which R was $CH_3(CH_2)_n$ having a mean value of n of 18 were added to 300 ml of $H_2O$ + 4 g of Na lauryl sulphate and homogenised as above. To this preemulsion 700 ml of $H_2O$ + 800 g vinyl chloride + 1.6 g of $K_2S_2O_8$ were added and polymerised at 50° C. The final latex contained particles having a size of 0.25–0.6 μm. The same amount of additive was used during the homogenisation as in example 3, and the particle size is approximately equal in the two examples. Formation of deposits was negligible and the latex has a very good stability in comparison with known latices.

EXAMPLE 5

The water-insoluble substance may be a sufficiently water-insoluble plasticiser for PVC.

10 g of dicetylphthalate + 4 g of Na lauryl sulphate + 200 ml of $H_2O$ were homogenised. To this preemulsion 800 ml of $H_2O$ + 800 g of vinyl chloride + 1.6 g of $K_2S_2O_8$ were added and polymerised at 50° C. The latex contained particles in the range 0.3 to 0.8 μm. Formation of deposits and stability as stated in example 1.

EXAMPLE 6

The process described in example 1 was employed, but with styrene as monomer. 10 g hexadecane + 5 g of Na lauryl sulphate + 200 ml of $H_2O$ were homogenised as described above. After homogenisation 800 ml of $H_2O$ + 600 g of styrene + 3 g of $K_2S_2O_8$ were added and polymerised at 60° C. The latex contained particles in the range 0.02–0.7 μm.

EXAMPLE 7

Some of the water-insoluble Substance I may be replaced by a more water-soluble Substance II. In this example there is used a plasticiser for PVC together with a small amount of hexadecane.

3 g of hexadecane + 6 g of dioctylphthalate + 200 ml of $H_2O$ + 4 g of Na lauryl sulphate were homogenised as described above. To this preemulsion 800 ml of $H_2O$ + 900 g of vinyl chloride + 1.6 g of $K_2S_2O_8$ were added and polymerised at 50° C. The latex contained particles in the range 0.3–0.8 μm. The particle size is approximately the same as in example 1. This is expected since the total amount of Substance I plus Substance II used during the homogenisation was approximately the same as the amount of Substance I in example 1. Formation of deposits and stability as in example 1.

EXAMPLE 8

In addition to a small amount of Substance I there may be used a Substance II which at the same time is a comonomer for vinyl chloride. Such comonomers are for instance acrylates. 3 g of hexadecane + 10 g of butylacrylate + 200 ml of $H_2O$ + 4 g of Na lauryl sulphate were homogenised as described above. To this preemulsion 800 ml of $H_2O$ + 800 g of vinyl chloride + 1.6 g of $K_2S_2O_8$ were added and polymerised at 50° C. The latex contained particles in the range 0.2–0.7 μm.

The particle size is somewhat smaller than in example 1 since more substance was used during the homogenisation. Formation of deposits and stability as in example 1.

EXAMPLE 9

This example corresponds to example 6, but some of Substance I (hexadecane) was replaced by the same amount of Substance II in the form of the main monomer (styrene).

3 g of hexadecane + 5 g of Na lauryl sulphate + 7 g of styrene + 250 ml of $H_2O$ were homogenised as described above. To this preemulsion 750 ml of $H_2O$ + 600 g of styrene + 3 g of $K_2S_2O_8$ were added and polymerised at 60° C. The latex contained particles in the range 0.20–0.7 μm.

The particle size is the same as in example 6. This is expected since the amount of substance used during the homogenisation is approximately the same.

EXAMPLE 10

As described for vinyl chloride in example 8 it is also possible for styrene polymerisation to use a comonomer as Substance II in addition to Substance I during the homogenisation. 10 g of hexadecane + 5 g of Na lauryl sulphate + 50 g of butyl acrylate + 250 ml of $H_2O$ were homogenised as described above.

To this preemulsion 750 ml of $H_2O$ + 600 g of styrene + 3 g of $K_2S_2O_8$ were added and polymerised at 60° C. The latex contained particles in the range 0.08–0.25 μm. In this example there has been used more substance during the homogenisation than in the previous examples. As expected a latex having very small particles is then obtained.

COMPARATIVE EXAMPLES

A. As an example of an ordinary process for emulsion polymerisation of vinyl chloride a mixture of 1000 ml of $H_2O$ + 800 g of vinyl chloride + 4 g of Na lauryl sulphate was stirred by ordinary stirring and after addition of 1.6 g of $K_2S_2O_8$ polymerised at 50° C. The latex contained particles in the range 0.03 to 0.08 μm, and there had been formed a large amount, approximately 10% of precipitated polymer, on the stirrer and on the walls of the polymerisation vessel (formation of deposits). In this case the particle formation takes place only in the aqueous phase, and the particle size is therefore very small.

B. As an example of an ordinary process for preparing poly-styrene by emulsion polymerisation 5 g of Na lauryl sulphate + 1000 ml of $H_2O$ + 600 g of styrene were stirred by ordinary stirring and after addition of 3 g of $K_2S_2O_8$ polymerised at 60° C. The latex contained particles in the range 0.06-0.1 μm. The formation of particles had taken place only in the aqueous phase, and the particle size was therefore very small.

C. There was also carried out an experiment in which 5 g of Na lauryl sulphate + 1000 ml of $H_2O$ + 600 g of styrene were homogenised for 1.5 min. Then 3 g of $K_2S_2O_8$ were added, and polymerisation was carried out at 60° C. The latex contained particles in the range 0.06-0.1 μm, and also in this case the particle formation has taken place in the aqueous phase only, and accordingly the particle size is very small. The reason is that the emulsion is very unstable after homogenisation due to the abscence of water-insoluble substance. The drops coalesce very rapidly, the surface of the drops is reduced, the emulsifier migrates to the aqueous phase, both apparently leading to initiation in the aqueous phase.

It has also been tried to carry out the present process by using cyklohexane, hexane, ethylene dichloride, chloroform or xylene which have been mentioned as solvents for the initiator in patent application No. 75.0065, instead of a water-insoluble solvent (Substance I) described herein. The homogenisation with water and emulsifier then led to unstable emulsions, and addition of extra water, vinyl chloride and water-soluble initiator then led to particle formation in the aqueous phase only, which resulted in latices with undesirably small particles.

In addition to potassiumperoxydisulphate, $K_2S_2O_8$, which has been used in the examples, it is also possible to use other water-soluble initiators such as hydrogen peroxide ($H_2O_2$) and ammonium peroxydisulphate [$(NH_4)_2S_2O_8$].

EXAMPLE 11

10 g of hexadecane, 5 g of sodium lauryl sulphate and 250 ml of water were homogenised in a "Manton Gaulin" homogenisator. To this preemulsion were added 750 ml of water + 900 ml of vinyl chloride. After 20 minutes of stirring 3.0 g of AIBN dissolved in 10 ml of dichloroethane were added, and stirring continued for 30 minutes. Then the temperature was increased to 50° C. and polymerisation was carried out for 7.5 hours. The polymer formed comprised 860 g of PVC per liter of water. There were no deposits on walls or stirrer in the reaction vessel. The particle size was very polydisperse, particle diameters lying in the range 300 to 100 nm.

EXAMPLE 12

10 g of hexadecane, 50 g of butyl acrylate, 250 ml of water and 5 g of sodium lauryl sulphate were homogenised by means of a "Manton Gaulin" homogenisator. To this preemulsion were added 750 ml of water + 500 g of styrene + 300 g of butyl acrylate. After stirring for 60 minutes 5 g of AIBN dissolved in 10 ml of dichloroethane were added. After further 60 minutes the temperature was increased to 60° C., and the polymerisation was carried out until approximately complete conversion. The latex formed was relatively monodisperse having a particle size in the range 120 to 150 nm.

I claim:

1. A process for preparing a latex which comprises homogenizing under pressure an aqueous mixture containing an emulsifier and a water-insoluble solvent for the vinylic monomer(s) to be polymerized, said solvent having a water-solubility at 25° C. of $<10^{-3}$ g/l $H_2O$ to form a stable preemulsion of said solvent in water, whereby the increased pressure of homogenization resulting in smaller but more drops in said preemulsion and consequently in the final latex, and then adding to said preemulsion the monomer(s) to be polymerized and optionally additional water, together with or followed by a polymerization initiator selected from water-soluble polymerization initiators and oil-soluble polymerization initiators having sufficient water solubility to diffuse through the aqueous phase into the drops formed by diffusion of the monomer(s) into said solvent, the weight ratio of emulsifier and solvent to total water being 1:500-1:50 and 1:1000-3:100, respectively, and the weight ratio of emulsifier and solvent to monomer(s) being 1:500-1:30 and 1:1000-1:20, respectively.

2. A process according to claim 1, wherein said water-insoluble solvent is capable of dissolving the monomer(s) in an amount of at least 100 times its own weight under the reaction conditions.

3. A process according to claim 2, wherein said water-insoluble solvent comprises an optionally halogenated alkane having at least 10 carbon atoms.

4. A process according to claim 1 wherein vinyl chloride is employed as monomer, and said water-insoluble solvent comprises a plasticiser or a stabiliser for polyvinyl chloride.

5. A process according to claim 4, wherein said plasticiser comprises a phthalate, phosphate, adipate or sebacate.

6. A process according to claim 4, wherein said plasticiser comprises an epoxy compound.

7. A process according to claim 1, wherein said water-insoluble solvent comprises a water-insoluble vinyl compound which will copolymerise with the main monomer during the polymerisation.

8. A process according to claim 7, wherein a vinyl ether, a vinyl ester, an acrylate or methacrylate or a substituted styrene is used as vinyl compound.

9. A process according to claim 8, wherein said vinyl ether comprises a higher vinyl ether of the formula $CH_2$=CHOR in which R is an alkyl group having at least 15 C-atoms.

10. A process according to claim 8, wherein said vinyl ester has the formula $CH_2$=CHOOCR in which R is an alkyl group having at least 15 C-atoms.

11. A process according to claim 8, wherein said acrylate or methacrylate has the formula $CH_2$=CH—COOR or

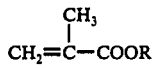

respectively, in which R is an alkyl group having at least 15 C-atoms.

12. A process according to claim 8, wherein said substituted styrene has the formula

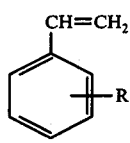

in which R is an alkyl group having at least 6 C-atoms.

13. A process according to claim 1 wherein said aqueous mixture which is homogenised additionally comprises a further substance which is partly water-soluble, the mixture of the water-insoluble and the partly water-soluble substance being a solvent for the monomer.

14. A process according to claim 13, wherein a latex of vinyl chloride is prepared and wherein said partly water-soluble substance comprises a plasticiser or a stabiliser for polyvinyl chloride.

15. A process according to claim 14, wherein said plasticiser comprises dibutylphthalate, dioctylphthalate or tricresylphosphate.

16. A process according to claim 13, wherein said partly water-soluble substance comprises a portion of the main monomer or a comonomer which will copolymerise with the main monomer upon polymerisation.

17. A process according to claim 16, wherein vinyl chloride is the main monomer, and said comonomer comprises a vinyl ester.

18. A process according to claim 17, wherein said comonomer comprises vinyl acetate or vinyl propionate.

19. A process according to claim 1 wherein from 1 to 30 parts by weight of said water-insoluble substance is homogenised in 25 to 500 parts by weight of water, whereafter the water is made up to 1000 parts and 600 to 1000 parts by weight of monomer are added.

20. A process according to claim 13 wherein from 5 to 200 parts by weight of said partly water-soluble substance are also homogenised.

21. The process of claim 1, wherein said oil-soluble initiator is azo-iso butyric acid nitrile.

* * * * *